(12) United States Patent
Miyashiro

(10) Patent No.: US 9,669,898 B2
(45) Date of Patent: Jun. 6, 2017

(54) ELECTRIC VEHICLE

(71) Applicant: YAMAHA HATSUDOKI KABUSHIKI KAISHA, Iwata-shi, Shizuoka (JP)

(72) Inventor: Shidehiko Miyashiro, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/139,359

(22) Filed: Apr. 27, 2016

(65) Prior Publication Data

US 2016/0318580 A1    Nov. 3, 2016

(30) Foreign Application Priority Data

Apr. 28, 2015   (JP) .................................. 2015-092145

(51) Int. Cl.
| | | |
|---|---|---|
| *B60K 11/00* | (2006.01) | |
| *B62M 7/02* | (2006.01) | |
| *B62K 11/04* | (2006.01) | |
| *B62K 11/00* | (2006.01) | |
| *B60L 11/18* | (2006.01) | |

(52) U.S. Cl.
CPC ............... *B62M 7/02* (2013.01); *B62K 11/00* (2013.01); *B62K 11/04* (2013.01); *B60L 11/1803* (2013.01); *B60L 2200/12* (2013.01); *B60L 2210/42* (2013.01); *B62K 2204/00* (2013.01); *B62K 2208/00* (2013.01)

(58) Field of Classification Search
CPC .. B60K 1/00; B60K 6/28; B60K 6/405; B60L 11/1868; B60L 11/1877; B60L 7/12
See application file for complete search history.

(56) References Cited

U.S. PATENT DOCUMENTS

| | | | |
|---|---|---|---|
| 2008/0011528 A1* | 1/2008 | Verbrugge | B60K 6/28 180/65.29 |
| 2012/0000720 A1* | 1/2012 | Honda | B62K 11/10 180/65.1 |
| 2012/0082881 A1 | 4/2012 | Tsukamoto et al. | |
| 2012/0097463 A1 | 4/2012 | Iwata et al. | |
| 2012/0176086 A1 | 7/2012 | Nakamura et al. | |
| 2014/0262568 A1 | 9/2014 | Matsuda et al. | |
| 2014/0292075 A1 | 10/2014 | Matsuda | |

FOREIGN PATENT DOCUMENTS

| | | |
|---|---|---|
| EP | 2 660 136 A1 | 11/2013 |
| WO | 2011/121758 A1 | 10/2011 |
| WO | 2013/061484 A1 | 5/2013 |

* cited by examiner

*Primary Examiner* — Bryan Evans
(74) *Attorney, Agent, or Firm* — Keating and Bennett, LLP

(57) ABSTRACT

An electric motorcycle includes a battery case accommodating a high voltage battery, a low voltage battery, a converter that decreases the voltage of the high voltage battery to supply the decreased voltage to the low voltage battery, and a motor case that accommodates the electric motor. The converter is located in the motor case. The electric motorcycle prevents users from accessing the converter.

14 Claims, 10 Drawing Sheets

ELECTRIC VEHICLE

BACKGROUND OF THE INVENTION

1. Field of the Invention

The present invention relates to layout of electric components mounted on an electric vehicle including a high voltage battery and a low voltage battery.

2. Description of the Related Art

Electric motorcycles including electric motors as power sources are being developed. An electric motorcycle includes a high voltage battery for supplying power to an electric motor and a low voltage battery for supplying power to electric components such as lamps, an indicator, a controller, or the like. In the vehicle disclosed in WO2013/061484, power from the high voltage battery is supplied to and charges the low voltage battery via a converter for decreasing the voltage of the power from the high voltage battery. In the vehicle disclosed in WO2013/061484, the converter is located in the battery case housing the high voltage battery so that the length of a high voltage line that connects the high voltage battery and the converter is reduced.

The converter is connected with the high voltage line connected to the high voltage battery. Accordingly, a restriction against access by users to the converter is desired. In a vehicle having a high voltage battery that is charged while being mounted on the vehicle body, users need not open the battery case in normal use of the vehicle. Therefore, in such a vehicle, the arrangement in which the converter is located in the battery case as described in WO2013/061484 can prevent users from accessing to the converter. Meanwhile, in a vehicle having a high voltage battery that is charged in a state where the battery is demounted from the vehicle body, the arrangement in which the converter is located in the battery case allows users to access to the converter when they open the battery case to demount the high voltage battery from the battery case. Regarding this problem, a structure in which the converter is contained in a dedicated case can prevent users from accessing to the converter. Such a structure, however, results in increase in the number of components, which may hinder achievement of a compact vehicle body.

SUMMARY OF THE INVENTION

Preferred embodiments of the present invention provide an electric vehicle capable of preventing users from accessing a converter.

An electric vehicle according to a preferred embodiment of the present invention includes a front wheel; a rear wheel; a high voltage battery; a low voltage battery that outputs power at a voltage lower than the high voltage battery; an electric motor that receives power from the high voltage battery to drive at least one of the front wheel and the rear wheel; a battery accommodating portion that accommodates the high voltage battery; a motor accommodating portion that accommodates the electric motor and is separated from the battery accommodating portion; and a converter located in the motor accommodating portion to decrease a voltage of the power from the high voltage battery and then supply the power at the decreased voltage to the low voltage battery.

According to a preferred embodiment of the present invention, the converter is located in a motor accommodating portion separated from the battery accommodating portion. Therefore, even when demounting the high voltage battery from the battery accommodating portion to be charged, it is possible to prevent access to the converter by users.

In an electric vehicle according to a preferred embodiment of the present invention, the motor accommodating portion may be positioned under the battery accommodating portion, and the converter may be located in the motor accommodating portion and positioned higher than the electric motor in a side view. With the above, it is possible to shorten the distance between the converter and the high voltage battery, and thus, it is possible to reduce the length of the line that connects the converter and the high voltage battery.

In an electric vehicle according to a preferred embodiment of the present invention, the motor accommodating portion may include a tray located in the motor accommodating portion and supporting the converter. With the above, it is possible to easily locate the converter in the motor accommodating portion.

In an electric vehicle according to a preferred embodiment of the present invention, the tray may support at least one of a power line that supplies the power from the high voltage battery to the electric motor, a power line that supplies the power from the high voltage battery to the converter, or a power line that supplies power from the converter to the low voltage battery.

In an electric vehicle according to a preferred embodiment of the present invention, the motor accommodating portion and the battery accommodating portion may be fixed to each other and include a common wall portion separating the motor accommodating portion and the battery accommodating portion, and the tray may be covered by the common wall portion. This arrangement facilitates the work of mounting the line, compared to a case in which each of the motor accommodating portion and the battery accommodating portion includes a wall portion that separates the motor accommodating portion and the battery accommodating portion.

In an electric vehicle according to a preferred embodiment of the present invention, the tray may include a heat sink mounted on the tray and thermally connected to the converter. With the above, it is possible to effectively cool the converter.

In an electric vehicle according to a preferred embodiment of the present invention, the low voltage battery may be located in the battery accommodating portion. With the above, when the battery accommodating portion is opened, it is possible to perform the work of exchanging or performing maintenance of the low voltage battery. Further, it is possible to prevent the line connecting the low voltage battery and the converter from being located outside the battery accommodating portion and the motor accommodating portion.

In an electric vehicle according to a preferred embodiment of the present invention, the low voltage battery may be located outward in a vehicle width direction from the high voltage battery. With the above, it is possible to prevent the width of the vehicle body in the front-back direction from becoming larger.

In an electric vehicle according to a preferred embodiment of the present invention, the battery accommodating portion may include a circumferential wall portion surrounding the high voltage battery in a plan view, and the circumferential wall portion may have a recess located on an inside surface thereof and accommodating the low voltage battery. With the above, it is possible to prevent the width of the vehicle body in the up-down direction from becoming larger.

In an electric vehicle according to a preferred embodiment of the present invention, the motor accommodating portion and the battery accommodating portion may be fixed to each other and have a common wall portion partitioning the motor accommodating portion from the battery accommodating portion, and a line connecting the low voltage battery and the converter may penetrate the common wall portion. This facilitates the work of mounting the line connecting the low voltage battery and the converter, compared to a case in which each of the motor accommodating portion and the battery accommodating portion has a wall portion separating the motor accommodating portion and the battery accommodating portion.

In an electric vehicle according to a preferred embodiment of the present invention, the high voltage battery may have a longitudinal shape that is elongated in a front-back direction of the vehicle body in a plan view, and the low voltage battery may be positioned outward in a vehicle width direction from the high voltage battery. With the above, it is possible to prevent the total width of the low voltage battery and the high voltage battery from becoming excessively large.

In an electric vehicle according to a preferred embodiment of the present invention, the motor accommodating portion and the battery accommodating portion may be fixed to each other and have a common wall portion separating the motor accommodating portion and the battery accommodating portion, and the common wall portion may include a receptacle attached on the common wall portion and may be electrically connected to the high voltage battery. With the above, it is possible to shorten the distance from the receptacle to the electric motor or the converter.

In an electric vehicle according to a preferred embodiment of the present invention, the battery accommodating portion may be a cover capable of being opened and closed, to cover the high voltage battery. With the above, when the cap is closed, it is possible to reliably hold the high voltage battery, and when the cap is opened, it is possible to demount the high voltage battery from the voltage body and charge.

In an electric vehicle according to a preferred embodiment of the present invention, the cover may cover an upper side of the high voltage battery, and the motor accommodating portion may be located under the battery accommodating portion and may be fixed to the battery accommodating portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following description explains electric vehicles according to preferred embodiments of the present invention. The following description explains an electric motorcycle as an example of the electric vehicles. Although the preferred embodiments of the present specification are described with reference to a motorcycle as an example of the electric vehicles, the preferred embodiments of the present invention may be applied to an electric tricycle or an electric automobile.

Figure 1:
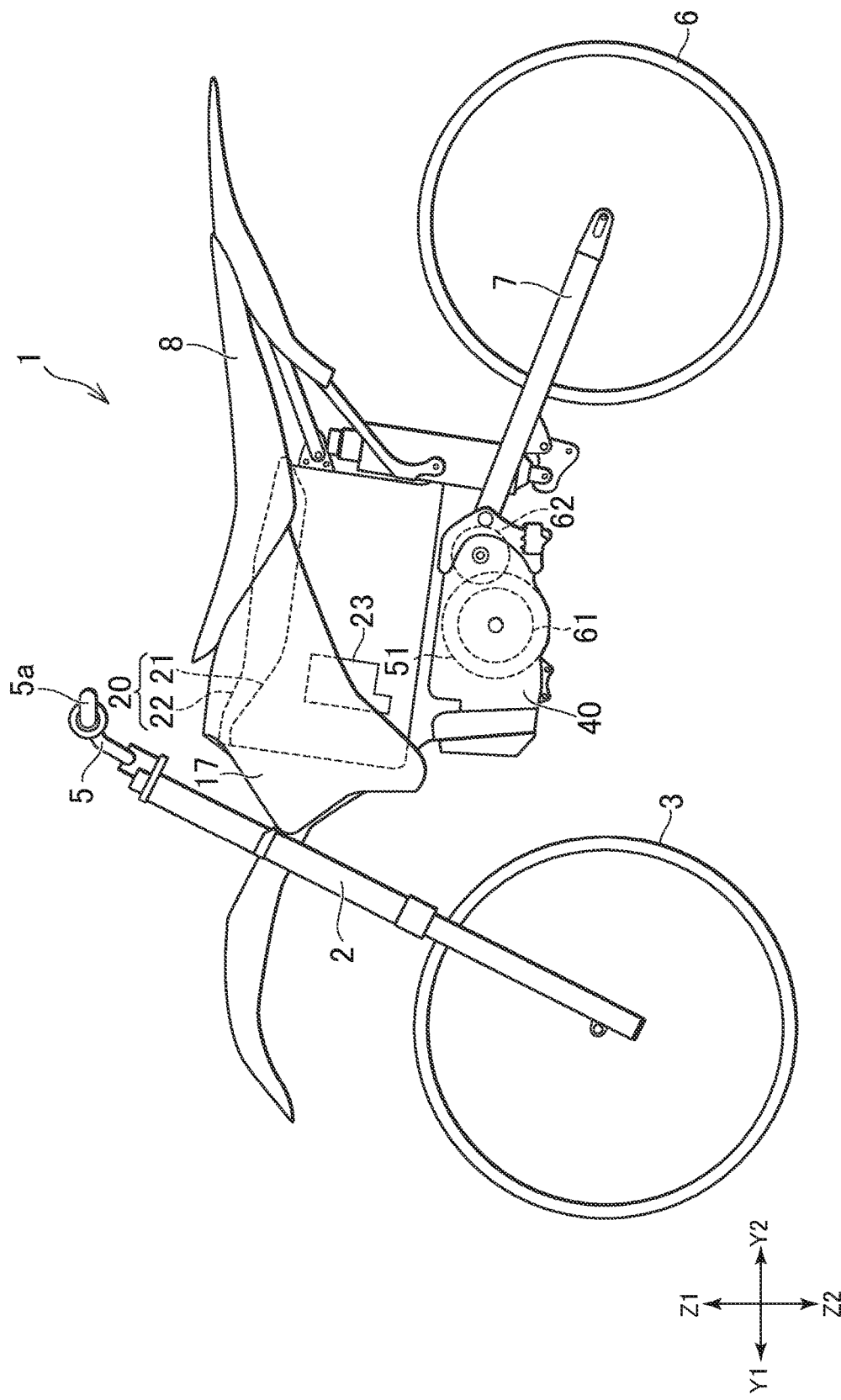
FIG. 1 is a side view of an electric motorcycle according to a preferred embodiment of the present invention.
Figure 2:
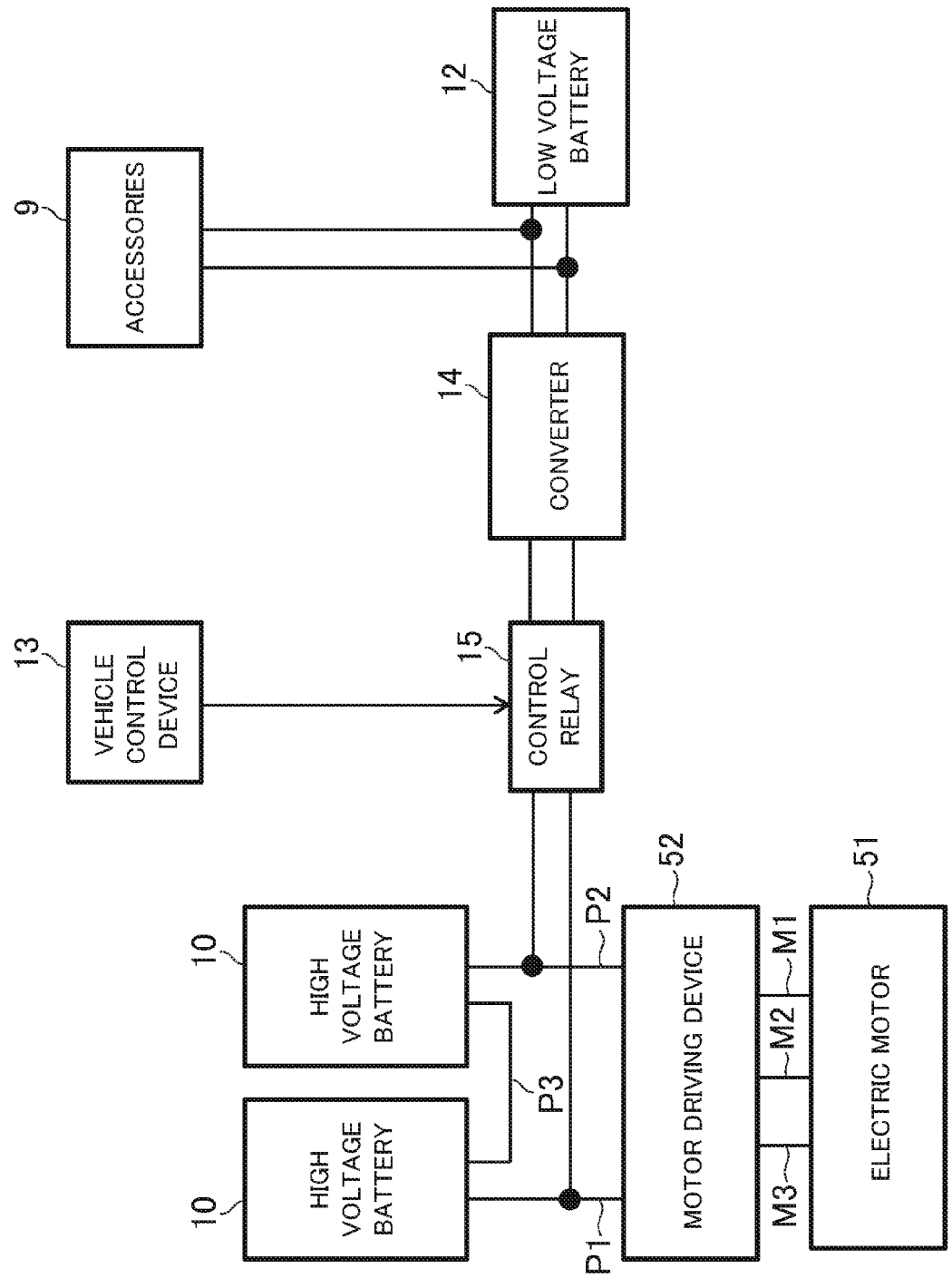
FIG. 2 is a block diagram showing devices equipped to the electric motorcycle shown in FIG. 1.
Figure 3:
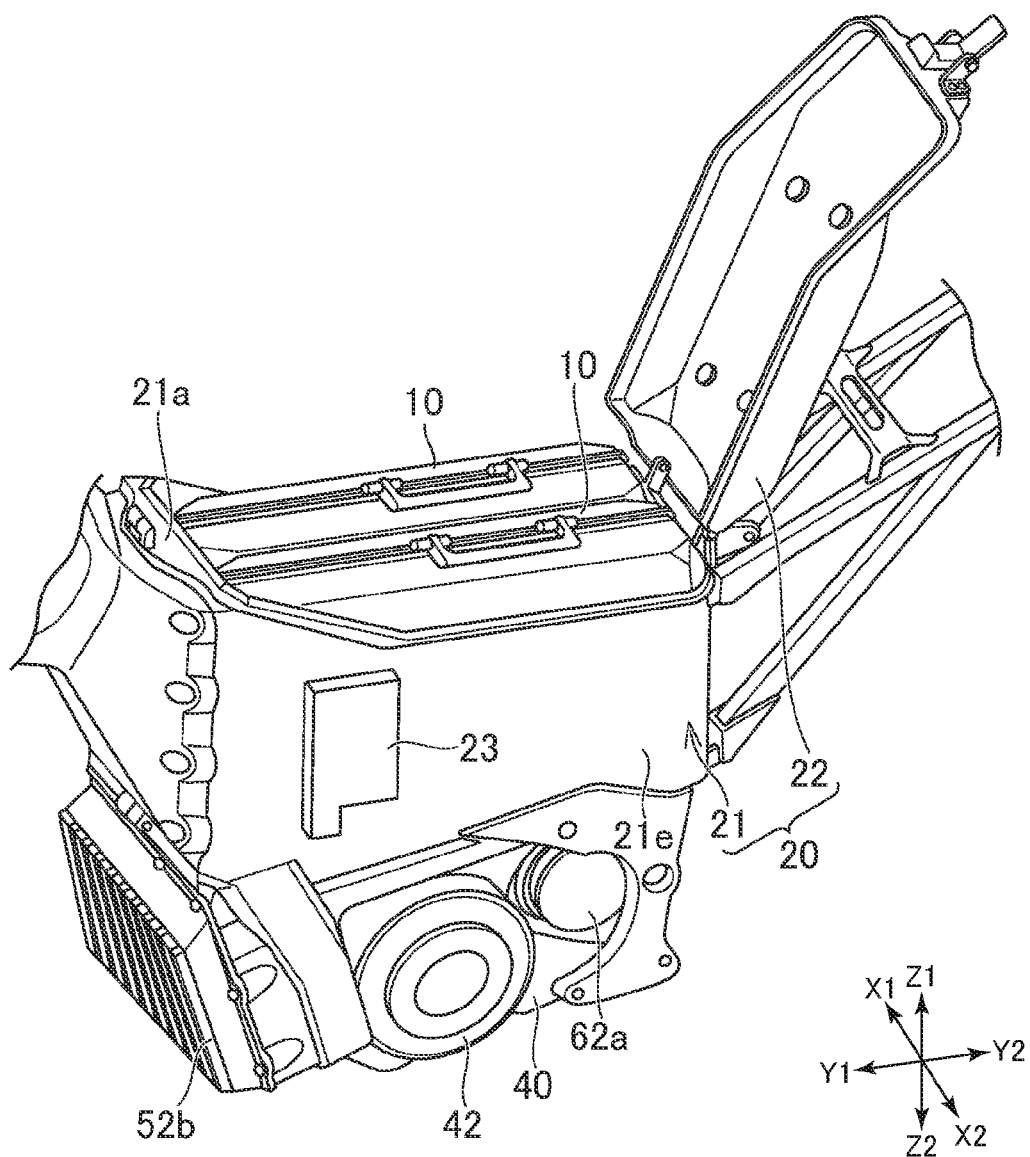
FIG. 3 is a perspective view showing an example of a battery case and a motor case equipped to the electric motorcycle shown in FIG. 1.
Figure 4:
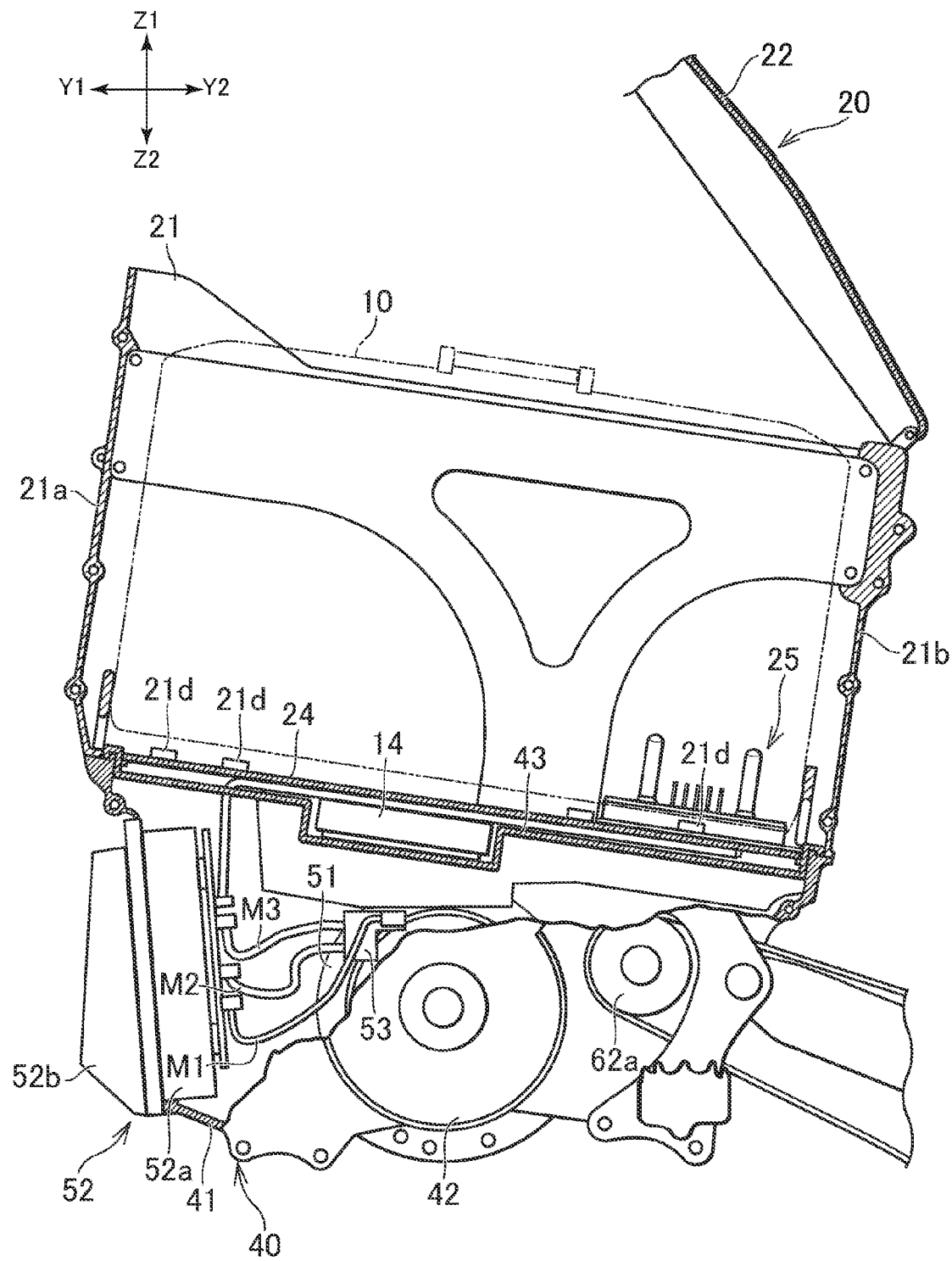
FIG. 4 is a cross sectional view showing the inside of a battery case, in which the motor case is partly cut off.
Figure 5:
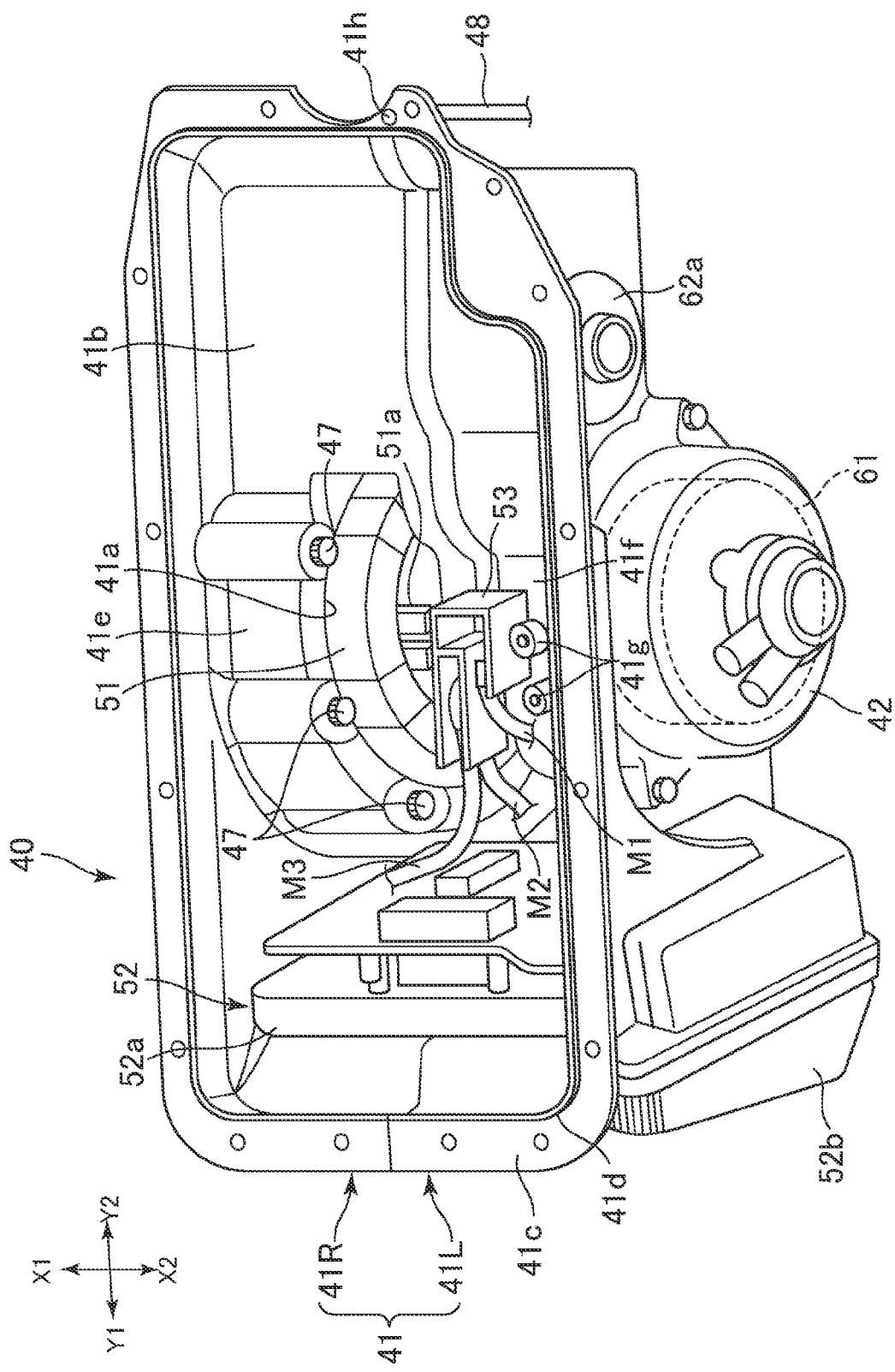
FIG. 5 is a perspective view of a motor case.
Figure 6:
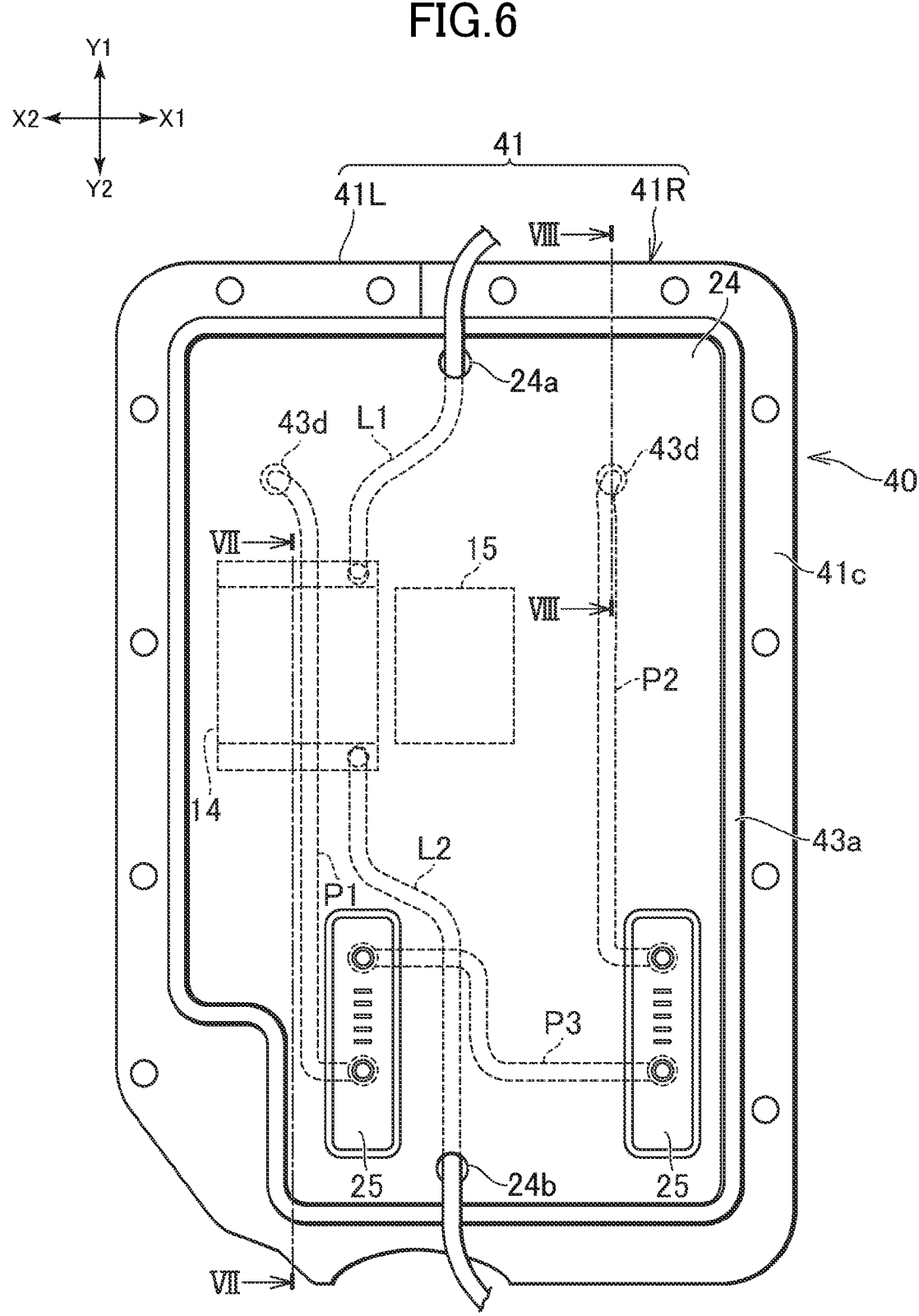
FIG. 6 is a plan view of a motor case covered by a partition plate defining the bottom of a battery case.
Figure 7:
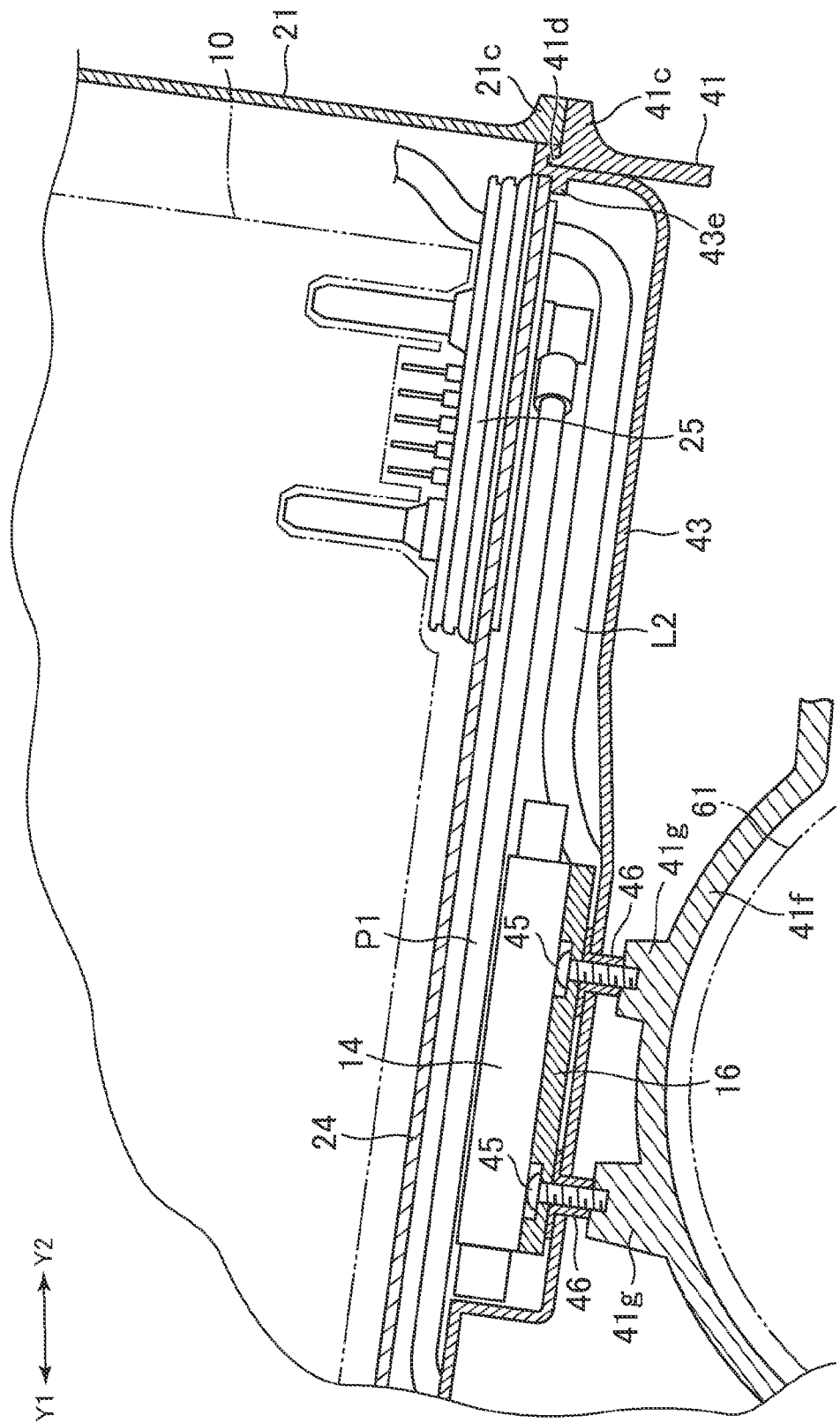
FIG. 7 is a cross sectional view along the line VII-VII in FIG. 6.
Figure 8:
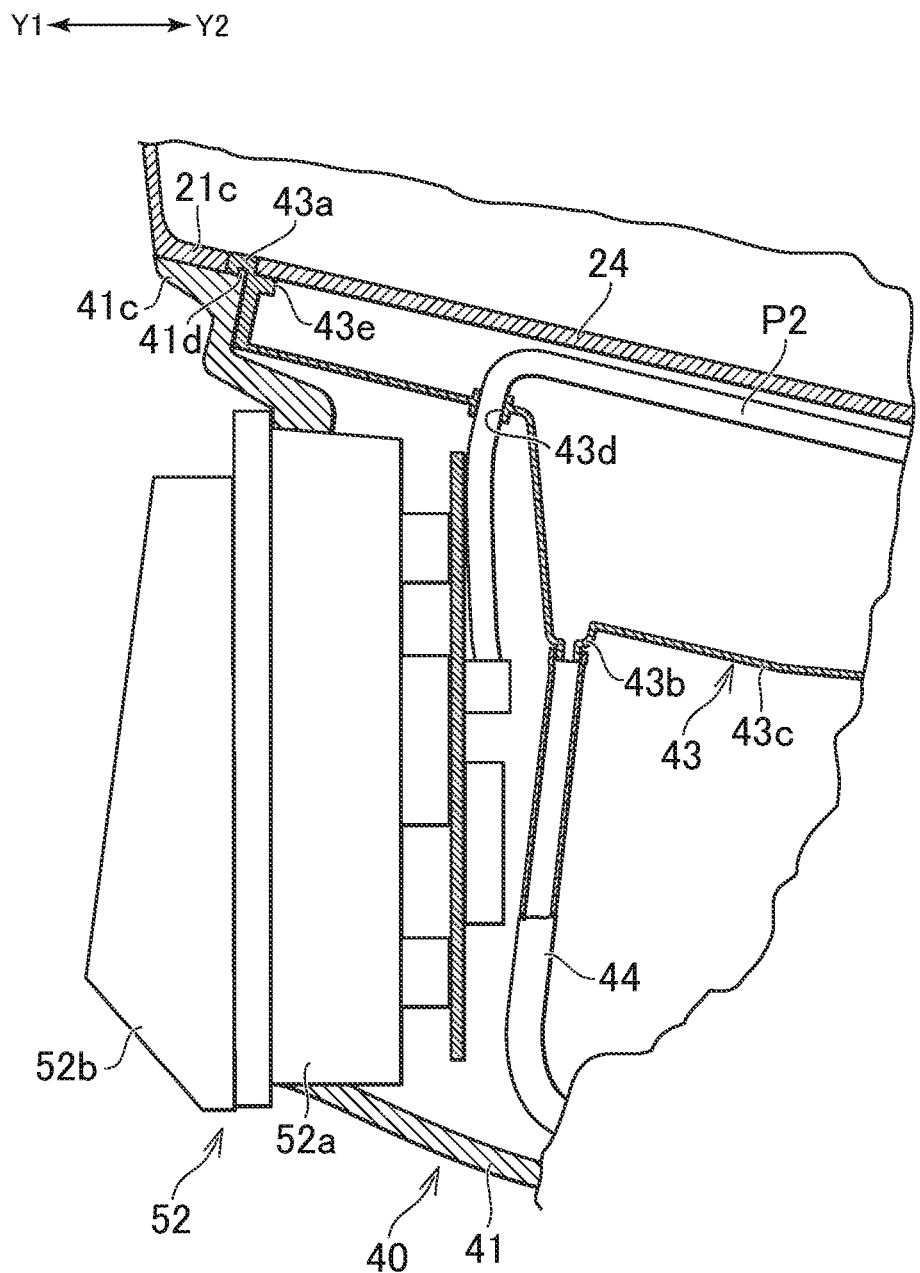
FIG. 8 is a cross sectional view along the line VIII-VIII in FIG. 6.
Figure 9:
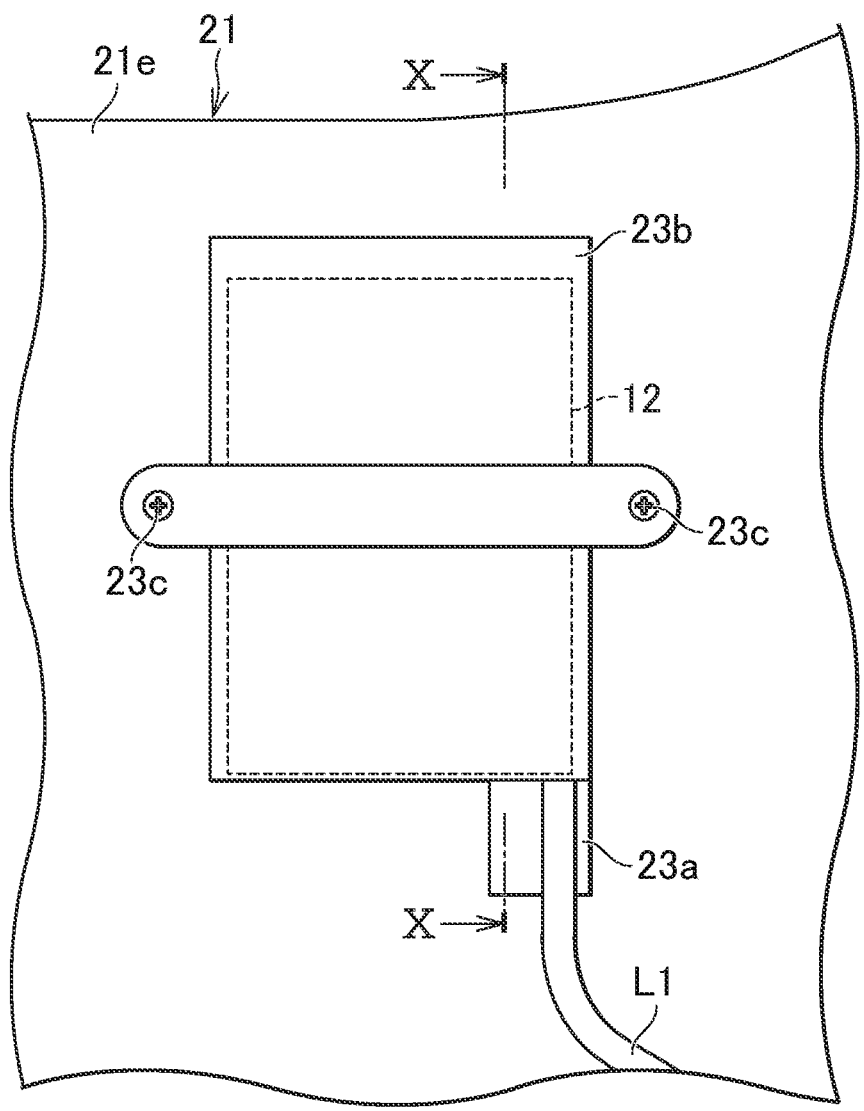
FIG. 9 shows the inside of the battery case, specifically showing a battery accommodating recess in which a low voltage battery is located.
Figure 10:
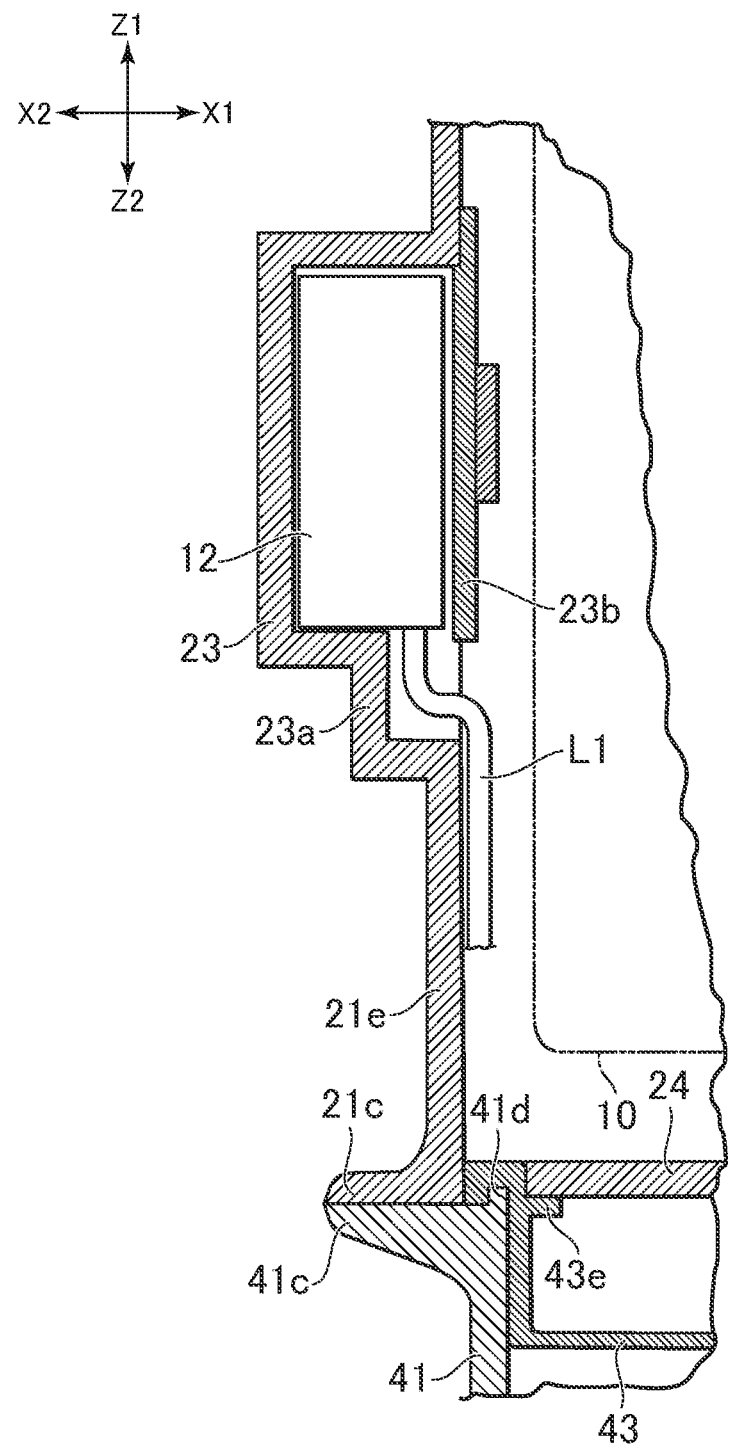
FIG. 10 is a cross sectional view along the line X-X shown in FIG. 9.

FIG. 1 is a side view of an electric motorcycle 1. FIG. 2 is a block diagram showing devices equipped to the electric motorcycle 1. FIG. 3 is a perspective view showing an example of a battery case 20 and a motor case 40 equipped to the electric motorcycle 1. FIG. 4 is a cross sectional view showing the inside of the battery case 20 and the motor case 40. In FIG. 4, the motor case 40 is partially cut off. FIG. 5 is a perspective view of the motor case 40. FIG. 6 is a plan view of the motor case 40, which is covered by a partition plate 24 defining the bottom of the battery case 20. FIG. 7 is a cross sectional view along the line VII-VII shown in FIG. 6. FIG. 8 is a cross sectional view along the line VIII-VIII shown in FIG. 6. FIG. 9 shows the inside of the battery case and depicts a battery accommodating recess 23 in which the low voltage battery 12 is located. FIG. 10 is a cross sectional view along the line X-X shown in FIG. 10.

In the description below, the directions indicated by Y1 and Y2 shown in FIG. 1 are referred to as the forward direction and the rearward direction, respectively. The directions indicated by Z1 and Z2 are referred to as the upward direction and the downward direction, respectively. Further, the directions indicated by X1 and X2 in FIG. 3 are referred to as the rightward direction and the leftward direction, respectively.

As shown in FIG. 1, the electric motorcycle 1 includes a front wheel 3 and a rear wheel 6. The front wheel 3 is supported at the lower end of a front fork 2 positioned in the front portion of the vehicle body. A steering handle 5 is fixed on the upper portion of the front fork 2. A grip 5a is arranged on each of the right and left sides of the steering handle 5. The grip 5a on the right side works as an accelerator grip. A seat 8 for a rider to sit straddling is located behind the steering handle 5. The rear wheel 6 is supported by rear arms 7, for example, and is able to move up and down together with the rear arms 7. The support structure of the rear wheel 6 is not limited to the above described. The rear wheel 6 may be supported by a case storing a mechanism to transmit a driving force, for example.

As shown in FIG. 2, the electric motorcycle 1 includes a high voltage battery 10 and an electric motor 51 that is driven by the power of the high voltage battery 10. A plurality of high voltage batteries 10 may be mounted on the electric motorcycle 1. The example explained as the electric motorcycle 1 includes two high voltage batteries 10. The two high voltage batteries 10 are serially connected. The two high voltage batteries may be connected in parallel instead.

The number of high voltage batteries 10 is not limited to any specific number, and may be one.

The electric motorcycle 1 includes a motor driving device 52. The motor driving device 52 includes an inverter that converts DC power of the high voltage battery 10 into AC power to supply the converted power to the electric motor 51. The motor driving device 52 is controlled by a vehicle controller 13, and supplies power to the electric motor 51 at a current value in accordance with an instruction value received from the vehicle controller 13. The driving force of the electric motor 51 is transmitted to the rear wheel 6 that is a driving wheel. The electric motor 51 may drive the front wheel 3.

As shown in FIG. 2, the electric motorcycle 1 includes a low voltage battery 12 to output a voltage that is lower than that which is outputted by the high voltage battery 10. The low voltage battery 12 supplies power to accessories 9. The accessories 9 may preferably include electric components, such as, lamp equipment and instrument (not shown), other than the electric motor 51 and the motor driving device 52. Power from the low voltage battery 12 may be supplied to the vehicle controller 13 and various sensors (for example, an encoder of the electric motor 51, a vehicle speed sensor, or the like). Note that the term a "high voltage" refers to a voltage higher than an output voltage of the low voltage battery 12 in this specification. The voltage of the high voltage battery 10 is not limited to a voltage at any specific value as long as the voltage is high enough to drive the electric motor 51.

As shown in FIG. 2, the electric motorcycle 1 includes a converter 14 to decrease the voltage of the high voltage battery 10 to supply the decreased voltage to the low voltage battery 12 and accessories. The high voltage battery 10 may be connected to the converter 14 directly or via other devices (for example, a circuit in the motor driving device 52). In the example explained as the electric motorcycle 1, a control relay 15 is provided between the high voltage battery 10 and the converter 14. The control relay 15 controls power supply from the high voltage battery 10 to the converter 14 according to an instruction from the vehicle controller 13. A backflow preventing relay may be provided between the low voltage battery 12 and the converter 14 to prevent a current from returning from the low voltage battery 12 to the converter 14 when the converter 14 is not operating.

As shown in FIG. 3, the electric motorcycle 1 includes a battery case 20 that stores the high voltage battery 10. The battery case 20 corresponds to a "battery accommodating portion". The high voltage battery 10 can be demounted from the battery case 20 and mounted therein. In the example of the high voltage battery 10, the battery case 20 has a box shape that is open upward. Therefore, the high voltage battery 10 is able to be removed upward from the battery case 20.

The battery case 20 includes a battery case main body 21 that is open upward and a cover 22 provided to the upper portion of the battery case main body 21. The cover 22 is able to be opened and closed, and cover the high voltage battery 10. As is to be described later, the battery case main body 21 is open downward as well, and the bottom of the battery case 20 is defined by the partition plate 24 (see FIG. 4). In the example explained as the electric motorcycle 1, the battery case 20 is able to accommodate a plurality of high voltage batteries 10 aligned in the left-right direction.

A phrase "accommodate the high voltage battery 10" does not necessarily mean to cover the entire outside surface of the high voltage battery 10. That is, the battery case 20 may cover the entire outside surface of the high voltage battery 10 or cover such that the high voltage battery 10 is partially exposed to the outside. The battery case 20 is not necessarily open upward. The battery case 20 may be open sideward, for example. The number of high voltage batteries 10 that can be stored in the battery case 20 is not limited to two, but may be one or three. The plurality of high voltage batteries 10 may be aligned in the front-back direction instead.

As shown in FIG. 5, the electric motorcycle 1 includes a motor case 40 accommodating the electric motor 51. The motor case 40 corresponds to a "motor accommodating portion". In the example of the electric motorcycle 1, the motor case 40 includes a motor case main body 41 that has a box shape open upward. An opening is located on the outside surface (on the right surface in the example shown in FIG. 5) of the motor case main body 41, and the electric motor 51 is inserted into the opening and fixed to the motor case main body 41. FIG. 5 depicts a plurality of fasteners (for example a bolt) 47 fixing the electric motor 51 to the motor case main body 41. As shown in FIG. 5, an opening 41a is located on the motor case main body 41. A portion 51a of the electric motor 51 to which a terminal is provided is inserted into the opening 41a to be located in the inside of the motor case main body 41. The motor case main body 41 includes power lines M1, M2, M3 located inside the main body 41 and connected to the terminals of the electric motor 51 to supply power to the electric motor 51. A terminal holder 53 holding the terminals of the power lines M1, M2, M3 is located in the motor case main body 41. The motor case 40 includes a motor cover (not shown) covering the outward portion of the electric motor 51 in the vehicle width direction (the rightward part in the example in FIG. 5). The structure of the motor case 40 is not limited to the example shown in FIG. 5. The motor case main body 41 may have a structure that allows the electric motor 51 to be located into the motor case main body 41 from above of the main body 41. In this case, the motor cover may not be provided to the motor case 40.

The motor driving device 52 supplies AC power to the electric motor 51 via the lines M1, M2, M3. In the example explained as the electric motorcycle 1, the motor driving device 52 as well is located in the motor case 40, as shown in FIG. 4. The motor driving device 52 is positioned further forward than the electric motor 51. An opening is provided on the front surface of the motor case main body 41 so that the main body 52a of the motor driving device 52 is located inside and fixed to the opening. The front surface of the motor driving device 52 is exposed forward. Therefore, when the vehicle is running, the front surface of the motor driving device 52 is able to be cooled by air hitting the front surface of the motor driving device 52. The motor driving device 52 includes a cooling fin 52b on the front surface thereof.

The electric motorcycle 1 includes a speed reducer 62 that reduces the speed of the rotation from the electric motor 51 to transmit the rotation to the driving wheel (the rear wheel) and a clutch 61 that disconnects transmission of the rotation from the electric motor 51 to the speed reducer 62 (see FIG. 1). As shown in FIG. 5, the clutch 61 is accommodated in the motor case 40. Specifically, an opening is provided on the outside surface of the motor case main body 41 (the left surface in the example shown in FIG. 5) so that the clutch 61 is inserted into the opening and fixed to the motor case main body 41. The motor case 40 includes a clutch cover 42 covering an outside portion in the vehicle width direction of the clutch 61 (a left portion in the example shown in FIG. 5). The speed reducer 62 is positioned behind the electric motor 51 and the clutch 61. The space where the speed reducer 62 is located and the space where the above described electric components such as the lines M1, M2, M3 are located are separated by a wall portion 41*b*. The speed reducer 62 is positioned below the wall portion 41*b*. As shown in FIG. 4, a rotating member 62*a* that outputs rotation with the speed reduced by the speed reducer 62 is located behind the motor case 40. The rotating member 62*a* may be a sprocket, a pulley, or the like, for example. The layout of the clutch 61 and the speed reducer 62 is not limited to the example described here.

The motor case main body 41 preferably includes two half-case members made of metal. For example, the motor case main body 41 includes a right case portion 41R and a left case portion 41L that are fixed to each other in the right-left direction. Alternatively, the motor case main body 41 may be made of a front case portion and a rear case portion instead.

The battery case 20 and the motor case 40 are fixed to each other. As shown in FIG. 4, in the example explained as the electric motorcycle 1, the motor case 40 is positioned below and fixed to the battery case 20. The battery case main body 21 and the motor case main body 41 have been made separately from each other, and the respective edges (the lower edge of the battery case main body 21 and the upper edge of the motor case main body 41) are fixed to each other by a fastener, such as a bolt or the like. Alternatively, the battery case main body 21 and the motor case main body 41 may have been made integrally. For example, the right case portion 41R of the motor case main body 41 and the right case portion of the battery case main body 21 may have been made integrally. Similarly, the left case portion 41L of the motor case main body 41 and the left case portion of the battery case main body 21 may have been made integrally.

The motor case 40 is separated from the battery case 20. That is, at least one of the motor case 40 and the battery case 20 has a member or a portion that partitions the insides of the motor case 40 from the battery case 20. In the example explained as the electric motorcycle 1, the battery case main body 21 is open downward as described above. The motor case main body 41 has a box shape that is open upward. As shown in FIGS. 7 and 8, the lower edge 21*c* of the battery case main body 21 and the upper edge 41*c* of the motor case main body 41 are fixed to each other by a fastener, such as a bolt or the like. The battery case 20 includes a partition plate 24 in the bottom portion thereof, and the inside space of the battery case main body 21 is separated from the inside space of the motor case main body 41 by the partition plate 24. The inside space of the battery case main body 21 and that of the motor case main body 41 may partially communicate to each other so that air or a cable can pass between the respective inside spaces. That is, the partition member/portion may have a hole or a cut portion formed thereon through which air or a cable passes.

The partition plate 24 is located below and support the high voltage battery 10. As shown in FIG. 4, a plurality of elastic members 21*d* made of rubber or a spring may be provided on the partition plate 24 to support the high voltage battery 10. This prevents a strong impact from being applies to the high voltage battery 10 in the battery case 20 while the vehicle is running. The material of the partition plate 24 may be resin, metal or the like, for example.

The structure that separates the motor case 40 and the battery case 20 is not limited to the above described example. For example, the battery case 20 may have a bottom wall, instead of the partition plate 24, which is integral to the battery case main body 21. Alternatively, the motor case main body 41 may have an upper wall that separates the motor case 40 and the battery case 20. The partition plate 24 may not be necessarily positioned at the same height as that of the lower edge 21*c* of the battery case main body 21 or the upper edge 41*c* of the motor case main body 41. That is, the partition plate 24 may be supported at a position higher than the lower edge 21*c* of the battery case main body 21 or lower than the upper edge 41*c* of the motor case main body 41.

As described above, the electric motorcycle 1 includes the converter 14. As shown in FIG. 4, the converter 14 is located in the motor case 40. That is, the converter 14 is positioned in a space where the electric motor 51 is located among the two spaces separated by the partition plate 24. This layout of the converter 14 prevents an operator from accessing the converter 14. Further, This layout of the converter 14 prevents an operator from accessing the high voltage line (a line connecting a receptacle 25 to be described later and the converter 41) connected to the converter 14.

As shown in FIG. 4, the receptacle 25 to which a connector unit of the high voltage battery 10 is electrically connected is mounted in the battery case 20. Power of the high voltage battery 10 is supplied to the converter 14 and the motor driving device 52 via the receptacle 25. The converter 14 is positioned higher than the electric motor 51 in a side view. This layout of the converter 14 shortens the distance between the converter 14 and the high voltage battery 10, in other words, the distance between the converter 14 and the receptacle 25. As a result, it is possible to shorten the line connecting the converter 14 and the receptacle 25.

As shown in FIGS. 6 and 7, the receptacle 25 is mounted on the bottom portion of the battery case 20. This further shortens the distance between the receptacle 25 and the converter 14. Note that the receptacle 25 may be connected to the converter 14 via other devices (for example, a circuit in the motor driving device 52 or the control relay 15).

As described above, the motor case main body 41 preferably has a box shape that is open upward. The converter 14 is positioned higher than the electric motor 51. Therefore, in the process of manufacturing the electric motorcycle 1, it is possible to prevent the converter 14 from being hidden by the electric motor 51 even after the electric motor 51 is mounted in the motor case main body 41. This can make the work of connecting a line to the converter 14 not troublesome. In the example explained as the electric motorcycle 1, the converter 14 is positioned higher than the clutch 61 and the speed reducer 62.

The receptacle 25 is mounted on the partition plate 24. The partition plate 24 is a member that works as a common wall portion of the battery case 20 and the motor case 40. That is, the partition plate 24 works as the bottom wall of the battery case 20 as well as the upper wall of the motor case 40. This shortens the distance between the receptacle 25 and the converter 14, for example, compared to a structure in which the bottom wall of the battery case 20 and the upper wall of the motor case 40 are made of different members.

As described above, in the example explained as the electric motorcycle 1, two high voltage batteries 10 are able to be mounted in the battery case 20. Therefore, two receptacles 25 for connection to the two respective high voltage batteries 10 are mounted on the partition plate 24. As shown in FIGS. 6 and 7, the lines P1, P2 extending to the motor driving device 52 are connected to the two respective receptacles 25. The negative terminal (or the positive terminal) of one receptacle 25 is connected to the positive terminal (or the negative terminal) of the other receptacle 25 via the line P3. This makes the two high voltage batteries 10 serially connected. The line connecting the converter 14 and the receptacle 25 may be branched from the lines P1, P2 to be connected to the converter 14, or may be provided separately from the lines P1, P2.

As shown in FIG. 4, the motor case 40 includes a tray 43 provided inside thereof. The converter 14 is supported by the tray 43. This facilitates laying out of the converter 14 in the motor case 40. In addition to the converter 14, other electric components may be mounted on the tray 43. For example, a circuit board of the vehicle controller 13 and a circuit board to control communication between devices of the vehicle (for example, a CAN board) may be located on the tray 43. Further, as shown in FIG. 6, the control relay 15 to control the converter 14 may be mounted on the tray 43. The material of the tray 43 is resin or metal, for example.

As shown in FIG. 7, a heat sink 16 is mounted on the tray 43, and the converter 14 is thermally connected to the heat sink 16. "Being thermally connected" means being in direct or indirect contact with so that heat of the converter 14 is transmitted to the heat sink 16. The shape and size of the heat sink 16 are not particularly limited. For example, the heat sink 16 is a panel member made of metal, as shown in FIG. 7. The converter 14 is in contact with the upper surface of the heat sink 16. The converter 14 may be pressed onto the heat sink 16. For example, an elastic member such as a spring or a rubber to urge the converter 14 onto the heat sink 16 may be provided to the partition plate 24. The converter 14 may be fixed to the heat sink 16 via a screw or other fastening member, for example.

The motor case main body 41 is preferably made of metal. The heat sink 16 is thermally connected to the motor case main body 41. The heat of the converter 14 is transmitted to the motor case main body 41 via the heat sink 16. The heat sink 16 is connected to the motor case main body 41 via a fastener, such as a screw, a bolt or the like. In the example shown in FIG. 7, the heat sink 16 is fixed (connected) to the motor case main body 41 by the plurality of fasteners (specifically, screws) 45 that penetrate the heat sink 16 and the tray 43. In detail, the motor case main body 41 includes a wall portion 41*f* covering the clutch 61; the fastener 45 is fixed to a boss 41*g* on the wall portion 41*f*; the fastener 45 extends in a tube collar 46. The above structure ensure a distance between the tray 43 and the wall portion 41*f* of the motor case main body 41. The structure that connects the heat sink 16 to the motor case main body 41 is not limited to the example shown in FIG. 7. For example, the boss 41*g* may not be provided on the wall portion 41*f*. In this case, the fastener 45 may be directly fixed to the wall portion 41*f*. Alternatively, the converter 14 may be indirect contact with a portion of the motor case main body 41. In this case, the portion of the motor case main body 41 works as a heat sink.

In the example explained as the electric motorcycle 1, the tray 43 has a shape in accordance with the upper edge (the edge of the opening) of the motor case main body 41 in a plan view of the motor case 40. As a result, the tray 43 has a larger area, and thus it is possible to effectively utilize the inside space of the motor case main body 41. The shape of the tray 43 is not necessarily in accordance with the motor case main body 41. For example, the tray 43 may be provided only in the front or rear portion of the motor case main body 41.

As shown in FIG. 8, the tray 43 is supported at the upper edge 41*c* of the motor case main body 41. In the example explained as the electric motorcycle 1, a projection 41*d* is provided on the upper edge 41*c* of the motor case main body 41. The projection 41*d* extends along the entire circumference of the upper edge 41*c* (the edge of the opening) of the motor case main body 41. The outer circumferential edge 43*a* of the tray 43 is hooked on the projection 41*d*. The structure that fixes the tray 43 is not limited to the above described. For example, the tray 43 may be fixed on the motor case main body 41 by a fastener, such as a screw or the like. A position where the tray 43 is located is not necessarily on the edge of the opening of the upper edge of the motor case main body 41. For example, the tray 43 may be fixed to a portion 41*e* of the motor case main body 41 that covers the electric motor 51 (FIG. 5) by a screw.

The outer circumferential edge 43*a* of the tray 43 is bent to cover an upper surface and side surfaces of the projection 41*d* of the motor case main body 41, as shown in FIG. 8. That is, the outer circumferential edge 43*a* preferably has a U shape or substantially U shape that is open downward, and the projection 41*d* is engaged with the outer circumferential edge 43*a*. Therefore, in the case where water enters into the space between the lower edge 21*c* of the battery case main body 21 and the upper edge 41*c* of the motor case main body 41, the projection 41*d* and the outer circumferential edge 43*a* prevent the water from entering the inside of the motor case 40. As shown in FIG. 4, the battery case main body 21 and the motor case main body 41 have structures such that the positions of the lower edge 21*c* and the upper edge 41*c* become higher toward the front thereof. Thus, water having entered the space between the lower edge 21*c* of the battery case main body 21 and the upper edge 41*c* of the motor case main body 41 flows rearward along the upper edge 41*c*. As shown in FIG. 5, the example explained as the electric motorcycle 1 has a hole 41*h* and a drain hose 48 that discharge downward the water flowing along the upper edge 41*c*.

The tray 43 is covered by the above described partition plate 24. The partition plate 24 works as a cover of the tray 43. Further, the partition plate 24 works as the bottom portion of the battery case 20 as well. This structure reduces the number of components of the motor case 40 and the battery case 20, and to reduce the width in the vertical direction of the motor case 40 and the battery case 20, compared to a structure in which the cover of the tray 43 and the bottom portion of the battery case 20 are made of different members. This structure facilitates the work of arranging the lines.

The partition plate 24 has a shape in accordance with the outer circumferential edge 43*a* of the tray 43. Therefore, the partition plate 24 covers the entire tray 43. This prevents dust or water from entering inside the tray 43. The partition plate 24 is supported at the outer circumferential edge 43*a* of the tray 43. For example, a projection 43*e* projecting inward is provided on the outer circumferential edge 43*a* of the tray 43, as shown in FIG. 8. The projection 43*e* extends along the entire circumference. The outer circumferential edge of the partition plate 24 is held by the projection 43*e*. The structure and the shape of the partition plate 24 are not limited to the above described example. For example, the partition plate 24 may be fixed to the battery case main body 21 by a fastener such as a bolt or the like.

As shown in FIGS. 6 and 7, the tray 43 supports various lines located in the motor case 40. The lines located on the tray 43 are positioned apart upward from the electric motor 51 and the motor driving device 52 (the lines P1, P2, P3, L1, L2 indicated by the broken lines in FIG. 6 are located on the tray 43). This arrangement prevents the lines from touching a high temperature portion of the electric motor 51 and the motor driving device 52.

In the example of the electric motorcycle 1, the tray 43 has a portion positioned under the receptacle 25. The tray 43 supports the lines P1, P2, P3 connected to the receptacle 25. As described above, the lines P1, P2 are high voltage lines connected to the motor driving device 52. The motor driving device 52 is positioned further forward than the electric motor 51. Meanwhile, the receptacle 25 is positioned further rearward than the electric motor 51. Therefore, the lines P1, P2 extend forward from the receptacle 25 toward the motor driving device 52 above the electric motor 51. As shown in FIGS. 6 and 8, a hole 43d is provided in a front portion of the tray 43. The lines P1, P2 pass through the hole 43d to extend to the space below the tray 43, that is, the space where the motor driving device 52 or the like is located. The line P3 connects the positive terminal (or the negative terminal) of one receptacle 25 and the negative terminal (or the positive terminal) of the other receptacle 25, as described above. The line P3 as well is mounted on the tray 43. A high voltage line connecting the receptacle 25 and the converter 14 as well is mounted on the tray 43.

As shown in FIG. 6, a low voltage line L1 extending to the low voltage battery 12 and the accessories 9 is connected to the converter 14. Further, a low voltage line L2 extending to the accessories 9 is connected to the converter 14. The lines L1, L2 extend through the partition plate 24 toward the inside of the battery case 20.

As shown in FIG. 6, the partition plate 24 has holes 24a, 24b provided thereon at positions avoiding the high voltage battery 10. Specifically, the holes 24a, 24b are provided on the foremost portion and the rearmost portion, respectively, of the partition plate 24. The respective lines L1, L2 extend upward through the respective holes 24a, 24b. This prevents interference between the lines L1, L2 and the high voltage battery 10 in the battery case 20. The line L1 extending into the battery case 20 through the hole 24a provided on the foremost portion of the partition plate 24 is connected to accessories (for example, a headlight) mounted in the front portion of the vehicle body. Meanwhile, the line L2 extending into the high voltage battery 10 through the hole 24b provided on the rearmost portion of the partition plate 24 is connected to accessories (for example, a tail light) mounted in the rear portion of the vehicle body. In the example shown in FIG. 6, the lines L1, L2 extend from the converter 14. In the case where a backflow preventing relay is provided between the converter 14 and the low voltage battery 12, the lines L1, L2 may be connected to the backflow preventing relay.

As described above, the tray 43 has a shape in accordance with the upper edge of the motor case main body 41. The entire outer circumferential edge of the tray 43 is attached on the upper edge of the motor case main body 41. Therefore, it is possible to discharge water having entered through the partition plate 24 into the motor case 40 to the outside by utilizing the tray 43. In the example explained as the electric motorcycle 1, as shown in FIG. 8, the tray 43 includes a discharge portion 43b that discharges water having entered the tray 43. The tray 43 includes a bottom portion 43c that positioned lower than a portion of the tray 43 that supports the converter 14. The bottom portion 43c includes the discharge portion 43b on the bottom portion 43c and open downward. One end of a drain hose 44 is connected to the discharge portion 43b. The drain hose 44 extends inside the motor case main body 41 to the outside of the motor case main body 41. With the above, it is possible to discharge water having entered beyond the partition plate 24 into the motor case 40 to the outside and thus the water is prevented from spreading inside the motor case main body 41. The other end of the drain hose 44 may be open outside the motor case main body 41 or closed by a cap or the like.

As described above, the battery case 20 has a structure that allows the high voltage battery 10 to be removed from the battery case 20. Specifically, the battery case 20 includes the cover 22 that can be opened and closed. In the example explained as the electric motorcycle 1, the low voltage battery 12 is accommodated in the battery case 20. Therefore, an operator is able to more readily access the low voltage battery 12, compared to a structure in which the low voltage battery 12 is located in the motor case 40. This resultantly facilitates the work of exchange or maintenance of the low voltage battery 12.

The battery case main body 21 surrounds the high voltage battery 10 in a plan view. In the present specification, the battery case main body 21 corresponds to a "circumferential wall portion surrounding a high voltage battery". In the example explained as the electric motorcycle 1, the battery case main body 21 surrounds two high voltage batteries 10. Meanwhile, the low voltage battery 12 is attached on the inner surface of the battery case main body 21. In detail, a recess 23 is provided on the inner surface of one of the plurality of wall portions (that is, the side wall portion 21e, the front wall portion 21a, and the rear wall portion 21b) defined by the battery case main body 21 (see FIG. 10, this recess will be hereinafter referred to as a battery accommodating recess), and the low voltage battery 12 is inserted in the battery accommodating recess 23. The arrangement that the low voltage battery 12 is located in the battery accommodating recess 23 prevents the space for the high voltage battery 10 from becoming narrower by the low voltage battery 12. Further, once the high voltage battery 10 is removed from the battery case 20, the low voltage battery 12 is able to be exchanged or repaired.

As shown in FIG. 10, the low voltage battery 12 is positioned farther outward in the vehicle width direction than the high voltage battery 10. That is, the above described battery accommodating recess 23 is provided on the side wall portion 21e of the battery case main body 21. This layout of the low voltage battery 12 enables other components and devices to be readily laid out around the front portion and the rear portion of the battery case 20. The rear portion of the battery case 20 is positioned under the seat 8, as shown in FIG. 1, and the low voltage battery 12 is positioned in the front portion of the battery case 20. Therefore, when a rider straddles the seat 8 and sandwiches the battery case 20 between his/her left and right knees, the low voltage battery 12 is less hindering for the rider.

The low voltage battery 12 is positioned farther outward in the vehicle width direction than the high voltage battery 10. The high voltage battery 10 has a shape that is long in the front-back direction of the vehicle body. Specifically, the high voltage battery 10 has a thin rectangular parallelepiped that is long in the front-back direction of the vehicle body, of which width in the vehicle width direction is smaller than the width in the front-back direction. Therefore, although the low voltage battery 12 is positioned outward the high voltage battery 10 in the vehicle width direction, the entire width of the low voltage battery 12 and the high voltage battery 10 is prevented from becoming excessively large. Note that the position of the battery accommodating recess 23 is not limited to the above described example. The battery accommodating recess 23 may be provided on the front wall portion 21a or the rear wall portion 21b of the battery case main body 21.

As described above, the electric motorcycle 1 has low voltage lines L1, L2. The line L1 connects the converter 14 and the low voltage battery 12. The line L1 extends from the converter 14 into the inside of the battery case 20 through the hole 24a formed on the partition plate 24. As the low voltage battery 12 is located inside the battery case 20, the line L1 connects the converter 14 and the low voltage battery 12 without passing outside the battery case 20 and the motor case 40.

As shown in FIGS. 9 and 10, a cover 23b that covers the low voltage battery 12 may be provided to the battery accommodating recess 23. The cover 23b may be fixed to the inside surface of the battery case main body 21 by a fastener 23c, such as a screw or a bolt.

As shown in FIGS. 9 and 10, a recess 23a smaller than the battery accommodating recess 23 is provided on the lower portion of the battery accommodating recess 23 (the lower portion is the portion that supports the lower surface of the low voltage battery 12). The line L1 extends through the recess 23a into the inside of the battery accommodating recess 23 to be connected to the low voltage battery 12.

As shown in FIGS. 9 and 10, the battery accommodating recess 23 is positioned apart upward from the bottom portion (that is, the partition plate 24) of the battery case 20. This facilitates the work of exchange and maintenance of the low voltage battery 12 by operators. The battery accommodating recess 23 is not limited to the above described. For example, the battery accommodating recess 23 may be provided in the bottom portion of the battery case 20.

The battery accommodating recess 23 projects toward the outside of the battery case main body 21. As shown in FIG. 1, the electric motorcycle 1 includes outer covers 17 on the right and left respective sides of the battery case 20. Since a portion of the low voltage battery 12, that is, a portion of the battery accommodating recess 23 located on the battery case 20, is covered by the outer cover 17 in aside view of the vehicle body, the battery accommodating recess 23 is less noticeable on the outside appearance of the vehicle body. Alternatively, the entire low voltage battery 12 may be covered by the outer cover 17.

As described above, the electric motorcycle 1 includes the motor case 40 separated from the battery case 20. The converter 14 is located in the motor case 40. This arrangement of the converter 14 prevents an operator from accessing the converter 14.

Note that the present invention is not limited to the above described preferred embodiments, and various modifications are possible.

For example, the battery case 20 and the motor case 40 are not necessarily fixed to each other. For example, the battery case 20 and the motor case 40 may be individually mounted on the vehicle body frame. In this case, the partition plate 24 may not be provided to the vehicle.

Further, the low voltage battery 12 may not be necessarily located in the battery case 20. For example, the low voltage battery 12 may be located outside the battery case 20 and attached on the outside surface of the battery case 20. Further, the low voltage battery 12 may not be necessarily attached to the battery case 20. For example, the low voltage battery 12 may be located in the rear portion of the vehicle body.

The "battery accommodating portion" is not limited to the box like battery case 20 covering the whole surfaces of the high voltage battery 10. The "battery accommodating portion" may expose a portion of the high voltage battery 10 to the outside.

The "motor accommodating portion" is not limited to the motor case 40 covering the whole surfaces of the electric motor 51. The "motor accommodating portion" may expose a portion of the electric motor 51 to the outside.

The present application claims priority to Japanese Patent Application JP 2015-092145 filed on Apr. 28, 2015, the entire contents of which are hereby incorporated by reference into this application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric vehicle, comprising:
a front wheel;
a rear wheel;
a high voltage battery;
a low voltage battery that outputs power at a voltage lower than the high voltage battery;
an electric motor that receives power from the high voltage battery to drive at least one of the front wheel and the rear wheel;
a battery accommodating case that accommodates the high voltage battery;
a motor accommodating case that accommodates the electric motor and is separated from the battery accommodating case; and
a converter that is located in the motor accommodating case and decreases a voltage of the power from the high voltage battery and supplies the power at the decreased voltage to the low voltage battery.

2. The electric vehicle according to claim 1, wherein
the motor accommodating case is positioned under the battery accommodating case; and
the converter is located in the motor accommodating case and positioned higher than the electric motor in a side view.

3. The electric vehicle according to claim 1, wherein the motor accommodating case includes a tray located in the motor accommodating case and supporting the converter.

4. The electric vehicle according to claim 3, wherein the tray supports at least one of a power line that supplies the power from the high voltage battery to the electric motor, a power line that supplies the power from the high voltage battery to the converter, or a power line that supplies power from the converter to the low voltage battery.

5. The electric vehicle according to claim 3, wherein
the motor accommodating case and the battery accommodating case are fixed to each other;
a common wall portion separates the motor accommodating case and the battery accommodating case; and
the tray is covered by the common wall portion.

6. The electric vehicle according to claim 3, wherein the tray includes a heat sink mounted on the tray and thermally connected to the converter.

7. The electric vehicle according to claim 1, wherein the low voltage battery is located in the battery accommodating case.

8. The electric vehicle according to claim 7, wherein the low voltage battery is located outward in a vehicle width direction from the high voltage battery.

9. The electric vehicle according to claim 7, wherein
the battery accommodating case includes a circumferential wall portion surrounding the high voltage battery in a plan view; and
the circumferential wall portion includes a recess on an inside surface thereof and accommodating the low voltage battery.

10. The electric vehicle according to claim 7, wherein
- the motor accommodating case and the battery accommodating case are fixed to each other;
- a common wall portion partitions the motor accommodating case from the battery accommodating case; and
- a power line connecting the low voltage battery and the converter penetrates the common wall portion.

11. The electric vehicle according to claim 1, wherein
- the high voltage battery has a longitudinal shape that is elongated in a front-back direction of the vehicle body in a plan view; and
- the low voltage battery is positioned outward in a vehicle width direction from the high voltage battery.

12. The electric vehicle according to claim 1, wherein the motor accommodating case and the battery accommodating case are fixed to each other;
- a common wall portion separates the motor accommodating case and the battery accommodating case; and
- the common wall portion includes a receptacle attached on the common wall portion and is electrically connected to the high voltage battery.

13. The electric vehicle according to claim 1, wherein the battery accommodating case includes a cover capable of being opened and closed to cover the high voltage battery.

14. The electric vehicle according to claim 13, wherein
- the cover covers an upper side of the high voltage battery; and
- the motor accommodating case is located under the battery accommodating case and fixed to the battery accommodating case.

\* \* \* \* \*